UNITED STATES PATENT OFFICE.

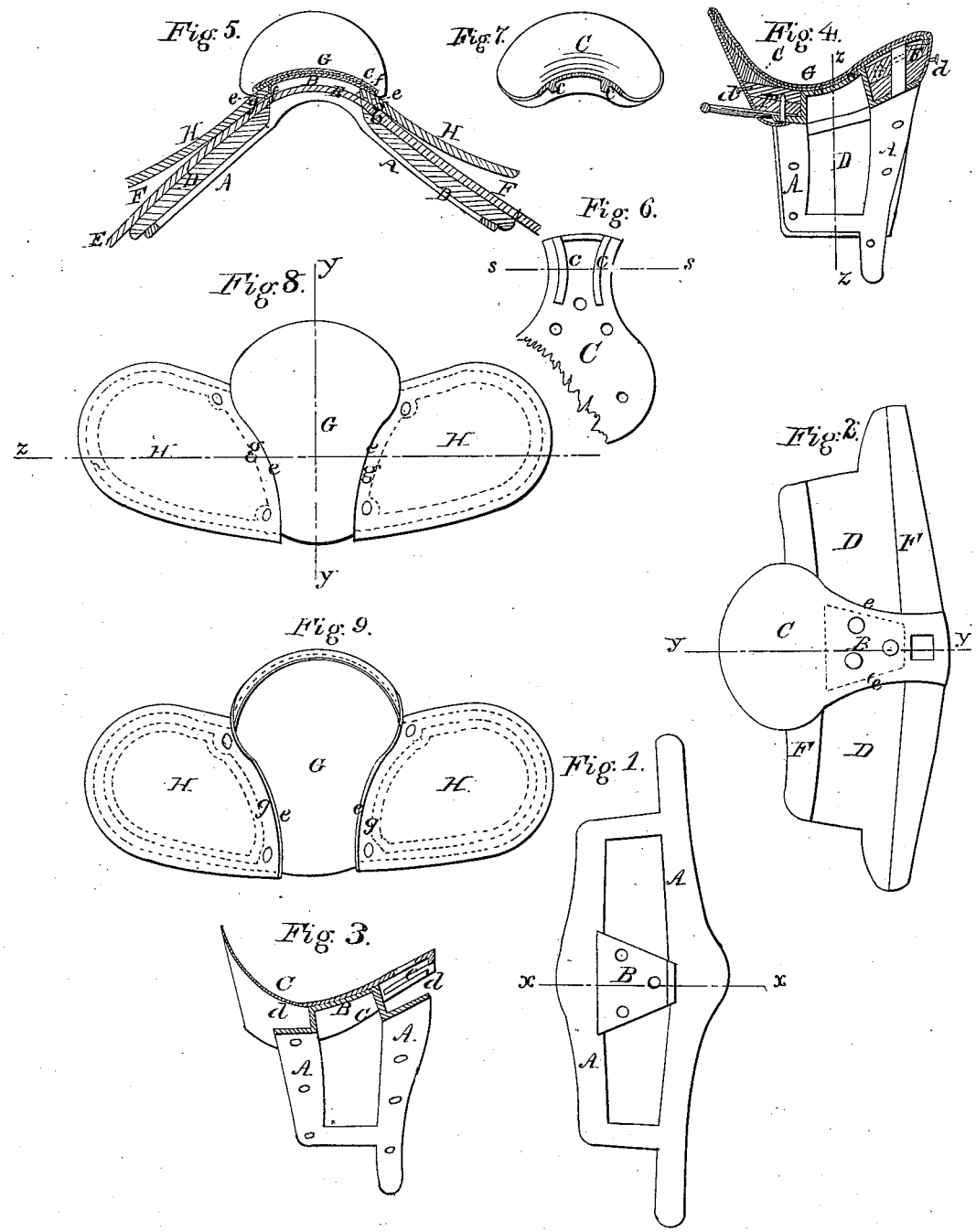

S. E. TOMPKINS, OF NEW YORK, N. Y.

METALLIC SADDLETREE FOR HARNESS.

Specification of Letters Patent No. 13,858, dated November 27, 1855.

*To all whom it may concern:*

Be it known that I, SAMUEL E. TOMPKINS, of the city, county, and State of New York, have invented a new and useful Improvement in Metallic Harness-Saddletrees; and I do hereby declare that the following is a full, clear, and exact description of the same, reference being had to the accompanying drawings, forming part of this specification, in which—

Figure 1, is a top view of a metal tree constructed with my improvements. Fig. 2, is a similar view of the tree, with the leather body, blocking and underseat arranged upon it. Fig. 3, is a vertical longitudinal section, through the line $x$, $x$, in Fig. 1, of the tree with simply the underseat secured upon it. Fig. 4, is a vertical longitudinal section through the line $y$, $y$, in Fig. 8, of the tree with the leather body, blocking underseat, top seat and skirts arranged upon it. Fig. 5, is a vertical transverse section through the line $z$, $z$, in Figs. 4 and 8, showing the manner in which the back band is passed under the seat. Fig. 6, is an inverted view of the underseat. Fig. 7, is a transverse section of the same through the line $s$, $s$, in Fig. 6. Fig. 8, is a plan of a second class saddle constructed on my improved tree.

My invention relates to metallic harness saddle trees and its main objects are, 1st, to facilitate blocking; 2nd, to form a free passage for the back band under the seat, and 3rd, to enable the manufacturer to make the commonest work or second class saddles with all the symmetry and beauty of most finished or first-class saddles, with an expenditure of very little work and labor, and at the same time afford him all the facilities for making first class finished saddles when desirable, with the same construction of tree.

The nature of my invention consists, 1st, in forming an elevated bridge on the top of the tree in such a manner that the head and tail of the tree shall be united and the tree thus strengthened, the under seat elevated sufficiently to allow of the blocking being carried entirely over the head and tail of the tree, the back band passed under the center of the same and the ends of the upper leather seat and skirts readily and neatly inserted under its edges in such a manner as to avoid the necessity of welting and seaming in manufacturing common work and at the same time to afford all the facilities for making first class finished work when desirable.

My invention consists, 2nd, in employing ribs on the front part of the underseat in combination with the bridge for the purpose of more perfectly keeping the underseat elevated at its front part in order to make room for the insertion of the ends of the leather seat and skirts as before stated.

To enable others skilled in the art to make and use my invention, I will proceed to describe its construction and operation.

A, represents the tree, it is made of metal, light and symmetrical in form as shown in Figs. 1, 3, and 5.

B, Figs. 1, 3, 4, and 5, is the bridge formed on top of the same; it is elevated slightly and rests upon the front and back portion of the tree and thus unites the same together in a manner to strengthen the tree as will be evident from the drawing.

C, Figs. 2, 3, 4, 5, 6, and 7, is the metal underseat. It is provided with ribs, $c$, $c$, on its underside and riveted fast to the elevated bridge B. The ribs $c$, $c$, which are made of greater or less length as the case and size of the tree may demand, serve for facing the underseat, but are designed especially for elevating the head or front of the same and thus, with the bridge, form recesses or grooves from the head to the tail of the tree on both sides to receive the ends of the leather seat and skirts as hereinafter shown.

D, is the part which forms the body of the tree and to which the tree is riveted fast. It is made of leather in the form shown in Figs. 2, 4, and 5, and has a piece cut out of its top directly under the seat in order that the back band E, shown in red, in Fig. 5, may pass freely under the bridge of the tree, in the manner illustrated.

By examining the drawing, Fig. 3, it will be seen that the underseat is elevated above the tree when riveted to the bridge and that spaces $d$, $d$, are formed between the body and the underseat for blocking F, F; it is by thus forming spaces for the blocking that the operation of blocking can be facilitated, this arrangement admitting of strips of leather of proper form being carried entirely over the tree as shown in Fig. 2, and thus avoiding fitting and skiving down as with trees commonly used. And owing to this, the tree maker himself can furnish the tree already blocked. Increased hold for the rivets securing the crupper loop, is also secured as the back blocking is thicker on account of the seat being elevated and the necessity of passing said rivets through the underseat avoided. A greater surface for tack holds and to work upon is likewise secured and thus the labor and inconvenience of constructing saddles upon metal trees considerably lessened. And any form of seat may be used without inconvenience or disadvantage as the blocking can be so readily fitted to correspond to the style of seat used.

By elevating the seat C, as shown, by bridge B, and ribs $c$, $c$, a groove $e$, is formed on each side of it from the head to the tail of the tree, and thus provision is made for the insertion of the ends $f$, $f$, of the leather seat G, and the ends $g$, $g$, of the skirts H, H, as shown in Fig. 5. It is by thus forming these grooves that the manufacturer is enabled to give second class saddles a neat and finished appearance when simply riveted together as illustrated by the saddle shown in Fig. 8, and when desirable can make a finished saddle with welt and seam as illustrated by the saddle shown in Fig. 9, without inconvenience or alteration in the tree.

What I claim as my invention and desire to secure by Letters Patent, is,

Providing metallic harness saddle trees with an elevated bridge B, substantially as and for the purpose set forth. And in combination with the same, I claim, employing ribs, $c$, $c$, on the front portion of the underseat, substantially as and for the purpose set forth.

SAML. E. TOMPKINS.

Witnesses:
   Jos. Geo. Mason,
   Wm. Tusch.